(12) United States Patent
Ooi

(10) Patent No.: US 6,961,787 B2
(45) Date of Patent: Nov. 1, 2005

(54) METHOD AND APPARATUS FOR UPDATING TASK FILES

(75) Inventor: Thien Ern Ooi, Penang (MY)

(73) Assignee: Intel Corporation, Santa Clara, CA (US)

(*) Notice: Subject to any disclaimer, the term of this patent is extended or adjusted under 35 U.S.C. 154(b) by 538 days.

(21) Appl. No.: 10/041,547

(22) Filed: Jan. 7, 2002

(65) Prior Publication Data
US 2003/0131125 A1 Jul. 10, 2003

(51) Int. Cl.[7] .................................................. G06F 3/00

(52) U.S. Cl. ................................. 710/19; 710/5; 710/8; 711/112

(58) Field of Search ........................... 710/5, 8, 15, 19, 710/35; 711/112

(56) References Cited

U.S. PATENT DOCUMENTS

| | | | | |
|---|---|---|---|---|
| 5,136,584 A | * | 8/1992 | Hedlund | 370/399 |
| 5,909,564 A | * | 6/1999 | Alexander et al. | 710/316 |
| 6,490,641 B2 | * | 12/2002 | Whetsel | 710/104 |
| 6,516,371 B1 | * | 2/2003 | Lai et al. | 710/305 |
| 6,519,216 B1 | * | 2/2003 | Suenaga et al. | 369/47.18 |

* cited by examiner

Primary Examiner—Jeffrey Gaffin
Assistant Examiner—Harold Kim
(74) Attorney, Agent, or Firm—Fish & Richardson P.C.

(57) ABSTRACT

A method and system for updating files includes transmitting a frame having status information and non-status information between a device and a host controller, storing the status information in a buffer, updating the non-status information in a non-status register, after updating the non-status information in the non-status register, determining if the frame has an error. The status register is updated if the frame includes no error.

29 Claims, 3 Drawing Sheets

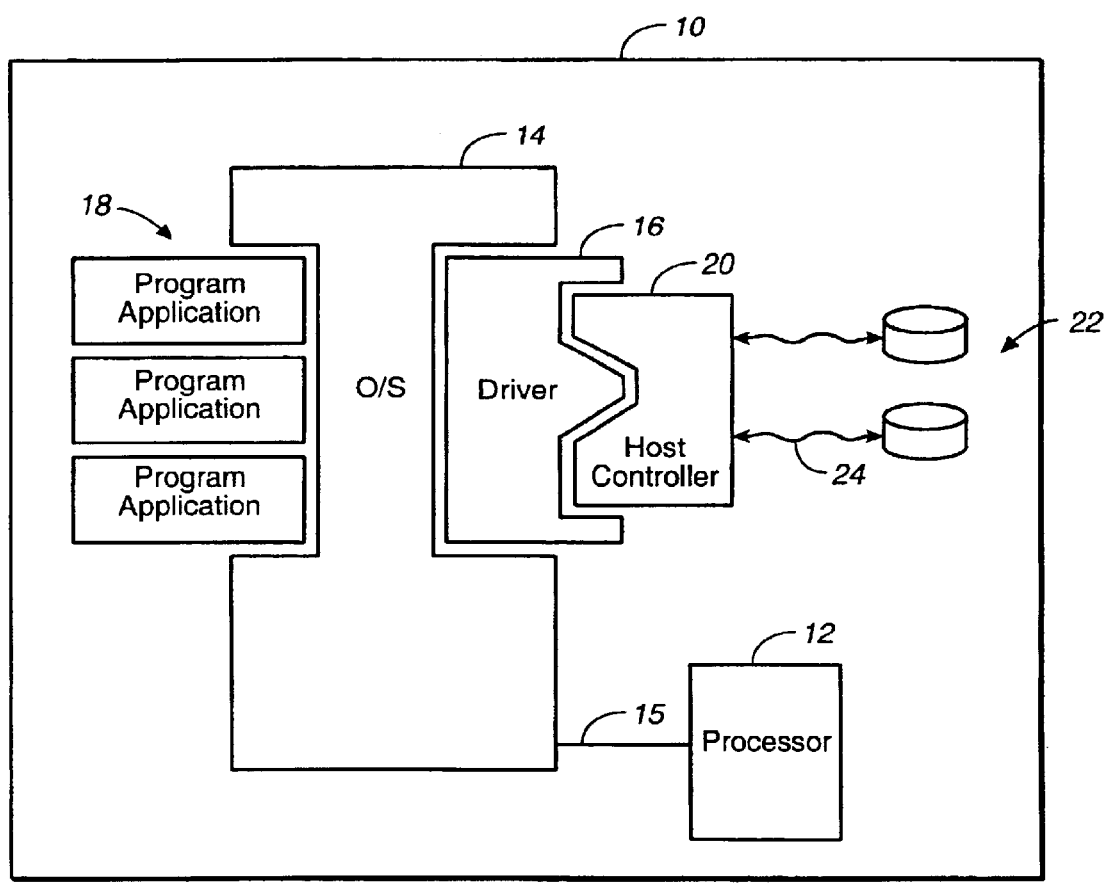
FIG._1

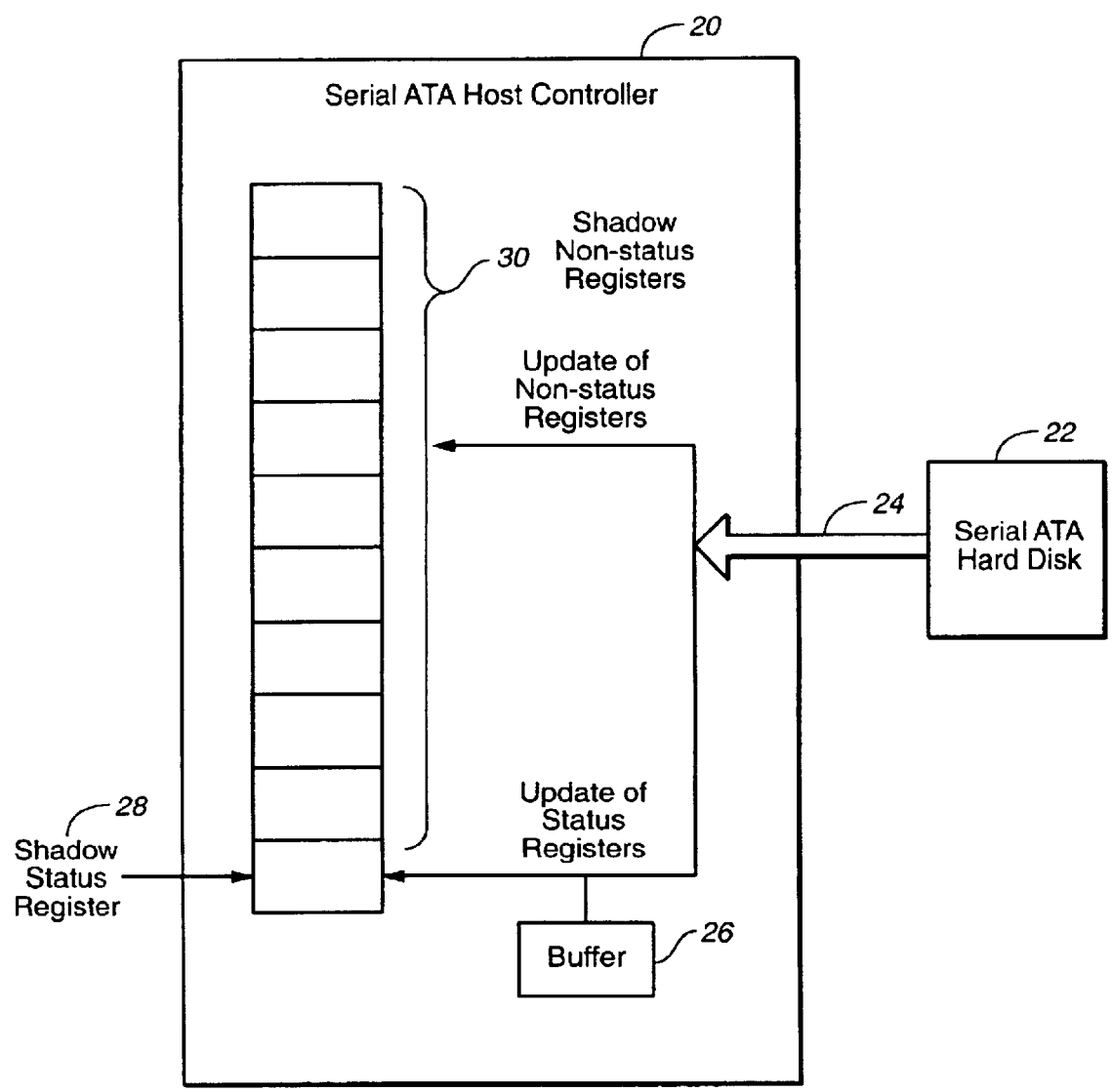
FIG._2

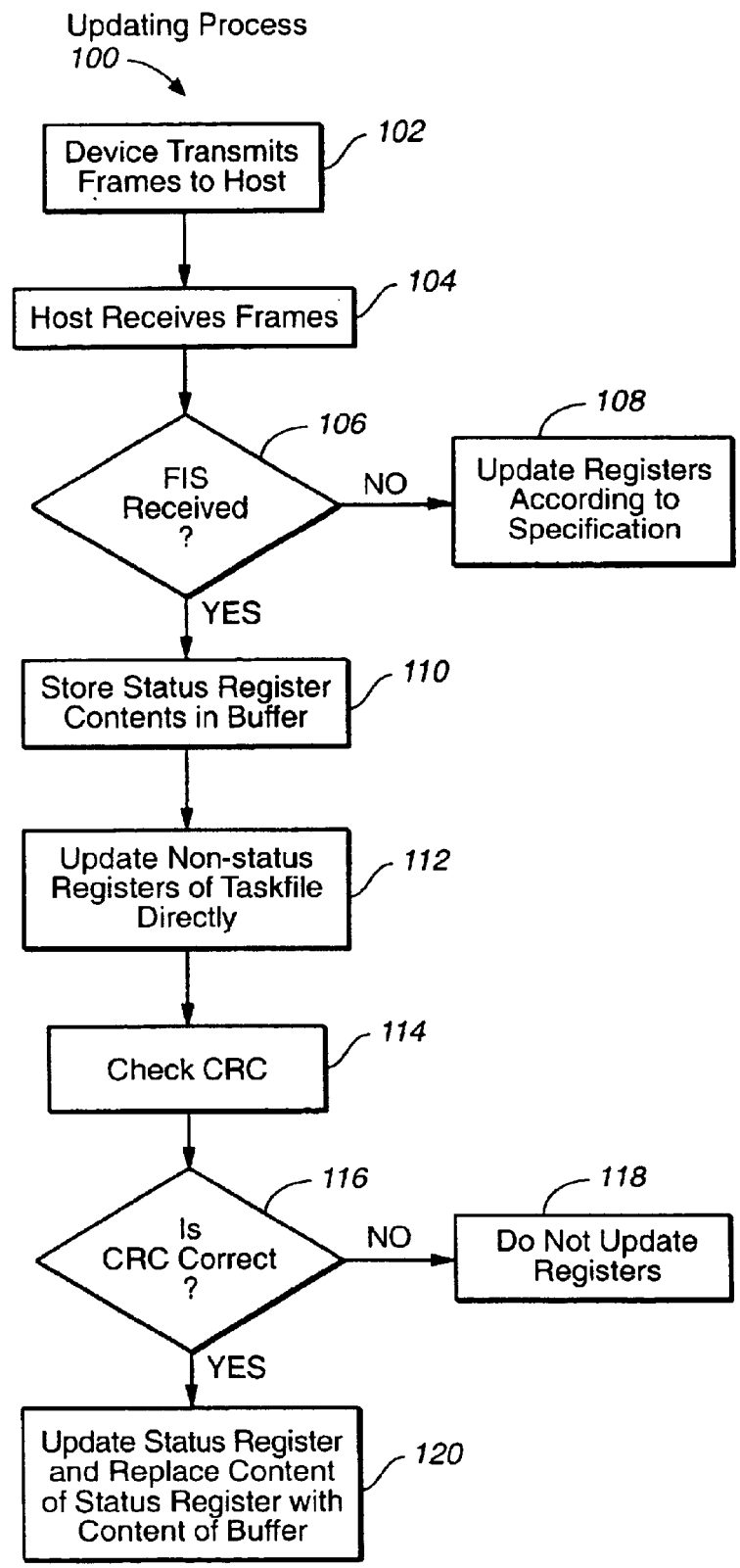
FIG._3

METHOD AND APPARATUS FOR UPDATING TASK FILES

FIELD OF THE INVENTION

This invention relates to file updates in electronic interfaces.

BACKGROUND

Typical computer systems include a common interface for connecting hard disks, CD-ROMs, DVD-ROMs and other storage-oriented devices to a computer (e.g., a desktop PC). Among these interfaces, Integrated Drive Electronics (IDE), also called by its official name, ATA (Advanced Technology Attachment), is a standard electronic interface used between the computer motherboard's data path or bus and the computer's disk storage devices. The IDE has been implemented in most computers used today in an enhanced version of IDE such as Enhanced Integrated Drive Electronics (EIDE) where the disk drive controller is built into the logic board in the disk drive of the computer. Since IDE was first implemented, newer and faster specifications have been developed to reduce cost and increase data transfer speed. To this end, the traditional Parallel ATA interface has been converted to a serial interface. The Serial ATA specification provides for systems having forward and backward compatibility with Parallel ATA as well as scalability and evolutionary enhancement to various types of computing platforms and chipsets in computer systems.

DESCRIPTION OF DRAWINGS

FIG. 1 is a block diagram of a computer.

FIG. 2 is a block diagram of a Serial ATA connection in the computer of FIG. 1.

FIG. 3 is a flowchart of an updating process in the Serial ATA connection of FIG. 2.

DETAILED DESCRIPTION

A method and system for updating files includes transmitting a frame having status information and non-status information between a device and a host controller, storing the status information in a buffer, updating the non-status information in a non-status register, after updating the non-status information in the non-status register, determining if the frame has an error. The status register is updated if the frame includes no error.

Referring to FIG. 1, a computer 10 includes a processor 12 coupled via a processor bus 15 to an operating system (OS) stack 14 residing in a system memory (not shown). The system memory includes a number of application programs 18 which is any type of program designed to perform a specific function directly to a user or another application (e.g., image editing and word processing applications). The application programs 18 use the services of the OS stack 14. In this example, the computer 10 is a desktop PC running on a chipset integrated onto a motherboard of the computer 10. The chipset (not shown) is a stable platform that provides high-speed connectivity to a number of units and components in the motherboard of computer 10.

The computer 10 also includes a driver 16 which provides software code or program that interfaces and interacts with a particular device (e.g., a hard disk). The driver 16 has special knowledge of the device or special software interface which application programs 18 lack. The driver 16 is a dynamic link library (DLL) file. In particular, the DLL file of the driver 16 is a small program that can be executed by the application programs 18 when needed. The DLL file supports one or more devices such as Serial Advanced Technology Attachment (ATA) hard disks 22 connected to the computer 10 which implement the interface specification used in the Serial Advanced Technology Attachment (Serial ATA) Specification 1.0. Serial ATA is a high-speed serial link replacement for the parallel ATA attachment of mass storage devices.

In operation, the computer 10 provides connectivity for a Serial ATA host controller 20 to the Serial ATA hard disks 22 through a serial cable 24 which carries high-speed data. The Serial ATA host controller 20 supplies a command interface to the driver 16 and the Serial ATA hard disks 22 for accessing the hardware status and control registers of the Serial ATA host controller 20, as further described below. Essentially, the Serial ATA host controller 20 provides a uniform method of accessing the OS stack 14 and the application programs 18 by enabling data transfer between the Serial ATA hard disks 22 and the driver 16 regardless of the bus architecture or computing platform. The application programs 18 include software, which initializes the Serial ATA host controller 20 and initiates a transfer of data between the Serial ATA hard disk 22 and the Serial ATA host controller 20.

Referring to FIG. 2, Serial ATA connectivity illustrates how the Serial ATA hard disk 22 is connected to the Serial ATA host controller 20. The Serial ATA hard disk 22 is directly connected to the Serial ATA host controller 20 through the serial cable 24. For direct connection, a device plug connector (not shown) is inserted directly into a host receptacle connector (not shown) of the Serial ATA hard disk 22. The device plug connector and the host receptacle connector incorporate features that enable a direct connection to be hot pluggable, that is, be connected without switching off the power. In addition to the serial cable 24, there is a separate power cable for the cabled connection such as a Serial ATA power cable (not shown). Although the Serial ATA hard disk 22 can be connected to a single port (not shown) at an interface such as the device plug connector between the Serial ATA host controller 20 and the Serial ATA hard disk 22, only the Serial ATA hard disk 22 is shown for exemplary purposes.

As is the case with standard Parallel ATA, the primary communication path in Serial ATA between the Serial ATA host controller 20 and the Serial ATA hard disk 22 is via a task file interface 32. The task file interface 32 provides the interface for transferring task files between the Serial ATA host controller 20 and the Serial ATA hard disk 22. The task file interface includes a set of shadowed non-status registers 30 and a shadowed status register 28. These two similar "shadow" registers such as shadowed non-status registers 30 and shadowed status register 28 (FIG. 2) are used to simulate the behavior of a single register in such a way as to allow for the serialization and transfer of Serial ATA task files between the Serial ATA host controller 20 and the Serial ATA hard disk 22. Serial ATA task files (not shown) are data frames which are an indivisible unit of information exchanged between the Serial ATA host controller 20 and the Serial ATA hard disk 22. A Serial ATA task file consists of a SOF (Start Of Frame) primitive, a Frame Information Structure (FIS), a CRC (Cyclic Redundancy Code) calculated over the contents of the FIS, and an EOF (End of Frame) primitive. The FIS is the user payload of the data frame that does not include the SOF, CRC, and EOF delimiters. The Serial ATA task file carries information for updating both the shadowed non-status registers 30 with non-status information (e.g., register type, setup type, and data type bits) as well as updating the shadowed status register 28 with status information (e.g., BSY or BUSY bits).

In certain implementations, status information relates to which unit has control of the task file interface 32 and accordingly the shadowed non-status registers 30. In other words, status information indicates a condition to both the Serial ATA hard disk 22 and the Serial ATA host controller 20 that the task file interface 32 is to be used exclusively by either only the Serial ATA hard disk 22 or the Serial ATA host controller 20. Thus, status information pertains to control of reading and writing processes of the shadowed non-status registers 30. On the other hand, non-status information relates to actual data frame payload such as FIS that are used to update the information included in the shadowed non-status registers 30.

Therefore, the shadow non-status registers 30 and status register 28 allow for the task file interface 32 to simulate a traditional single ATA register, e.g., Parallel ATA. The shadow non-status registers 30 and status register 28 provide functionally identical portions to a traditional single (non-shadowed) ATA task file because legacy host software that is only Parallel ATA or ATA aware can still access the task file interface 32 in the exact same manner and will function correctly. In this case, however, the application programs 18 view the Serial ATA hard disk 22 as if it were a "master" with no master/slave communication configuration such as a "daisy chain."

The Serial ATA host controller 20 further includes a buffer 26 for storing the Serial ATA task files being transmitted from the Serial ATA host controller 20 and the Serial ATA hard disk 22. In the Serial ATA connectivity shown in FIG. 2, the buffer 26 is used to store only the non-status information of the task files.

Still referring to FIG. 2, the shadowed non-status registers 30 and the shadowed status register 28 are interface control block registers used for device control and to post alternate status. More specifically, the shadowed non-status registers 30 and the shadowed status register 28 deliver commands between the Serial ATA host controller 20 and the Serial ATA hard disk 22 or posting status from the Serial ATA hard disk 22. In short, the shadowed non-status registers 30 and the shadowed status register 28 make possible an emulation of Parallel ATA device behavior as perceived by a basic input output system (BIOS) or software driver of the Serial ATA host controller 20. The behavior of commands, control block registers, Direct Memory Access (DMA), resets, interrupts are all emulated. For example, the shadowed non-status registers 30 and the shadowed status register 28 of the Serial ATA host controller 20 shadow the contents of the traditional device registers (e.g., the shadow register block or control block registers). The Serial ATA hard disk 22 when connected to the Serial ATA host controller 20 either writes or reads data depending on what information has been stored in the shadowed status register 28.

An example process for optimizing and updating the shadowed non-status registers 30 and the shadowed status register 28 after receiving the Serial ATA task file is described in more detail with respect to FIGS. 2 and 3.

Referring to FIG. 3, an updating process 100 involves transmitting data frames (102) from the Serial ATA hard disk 22 to the Serial ATA host controller 20. This is essentially a transfer of data from a disk storage device to the main memory of the processor 12 at the command of the memory management unit, i.e., the system memory of the computer 10. The Serial ATA host controller 20 receives the data frames (104) through the serial cable 24 (FIG. 2). The Serial ATA host controller 20 checks to see if the frame received is the register FIS or a programmed input/output setup frame information structure (PIO SETUP FIS) having new values, i.e., new status and non-status information in their data frames (106). Register PIO SETUP FIS is used to access device registers such as the shadowed non-status registers 30 and the shadowed status register 28 and also used to describe one form of data transfers. Register PIO data transfers are performed by the processor 12.

If either register FIS or PIO SET UP has been received (110), the processor 12 of the computer 10 stores only the status information in the buffer 26. In this updating process 100, the fact that only the status information is stored in the buffer 26 provides an optimal usage of the buffer making available at least 80 bits of memory in the buffer. In short, the buffering of the non-status information of the data frame is eliminated, significantly optimizing the updating process 100.

If no register FIS is received, the host controller waits until the register FIS is received, which results in the Serial ATA host controller 20 following the processes as described in the transport layer of the Serial ATA specification. Thereafter, the shadowed non-status registers 30 are updated directly (112) regardless of whether a CRC of the data frame being transmitted from the Serial ATA hard disk 22 to the Serial ATA host controller 20 has been verified or not. After the shadowed non-status registers 30 have been updated (112), CRC verification is applied (114) and it is determined whether or not an error has been detected (116). If there is an error upon the CRC verification (118), the shadowed status register 28 is not updated. However, if no error has been detected (120), the shadowed status register 28 is finally updated with the status information stored in the buffer 26. Moreover, together with the shadowed status register 28, an alt-status (alternate status) register (not shown) is also updated with the status information stored in the buffer 26. The alt-status includes the same status information as the shadowed status register 28. The alt-status register is used because when the applications 18 read the shadowed status register 28, a side effect of clearing an interrupt pending flag occurs. The interrupt pending flag is a flag set by the Serial ATA hard disk 22 when it generates an interrupt. The read to the alt-status register does not have this side effect. The read returns the same value as a read to the shadowed status register 28.

To verify that the updating process 100 has been correctly implemented, the Serial ATA hard disk sends, for example, a register FIS with an incorrect CRC or a CRC having an error to the Serial ATA host controller 20. Software of the applications 18 reads the shadowed registers to check if the shadowed non-status registers have been updated. If the shadowed non-status registers have been updated, this is an indication that the updating process 100 has occurred.

In the example described above in conjunction with FIGS. 1 and 2, Serial ATA defines the physical, electrical, transport, and command protocols for the internal attachment of mass storage devices such as the Serial ATA hard disk 22 to the PC motherboard of the computer 10. For instance, the serial link employed in the data channel 24 is a high-speed differential layer that utilizes Gigabit technology and 8b/10b encoding. Other interface specifications can be used such as the Advanced Technology Attachment Packet Interface (ATAPI) specification. ATAPI provides the additional commands needed for controlling a device such as a CD-ROM player or tape backup so that computer 10 can use an IDE interface and controllers to control relatively newer device types. ATAPI is part of the Enhanced IDE interface, also known as ATA-2.

Furthermore, the Serial ATA hard disk 22 can be any form of storage device that is connected to the Serial ATA host controller 20 provided the Serial ATA hard disk 22 adheres to a particular specification or standard. For example, the Serial ATA hard disk 22 can be a DVD drive or a CD-RW drive which are connected to a PC motherboard of the computer 10 via serial cable 24.

Other embodiments are within the scope of the following claims.

What is claimed is:

1. A method comprising:

transmitting a frame having status information and non-status information between a device and a host controller;

storing the status information of the frame in a buffer;

updating the non-status information in a non-status register;

after updating the non-status information in the non-status register, determining if the frame has an error; and updating a status register of the host controller if the frame includes no error.

2. The method of claim 1 wherein determining if the frame has an error includes transmitting a cyclic redundancy code (CRC) applied to the frame being transmitted.

3. The method of claim 1 further comprising transmitting a next set of data transfer commands after updating the status register of the host controller.

4. The method of claim 3 wherein the transmitting of the frame and the transmitting of the next set of data transfer commands is performed in a serial fashion.

5. The method of claim 3 wherein the data transfer commands are selected from a group of interface specifications consisting of Advanced Technology Attachment (ATA) specification, Serial ATA specification, and Advanced Technology Attachment Packet Interface (ATAPI) specification.

6. The method of claim 1 further comprising establishing shadow task file registers within the host controller.

7. The method of claim 6 wherein the shadow task file registers include the status registers and non-status registers.

8. The method of claim 6 wherein the shadow task file registers emulate legacy parallel task file configurations.

9. The method of claim 1 wherein the transmitting of the frame from the device to the host controller includes transmitting a register frame information structure (FIS).

10. The method of claim 1 wherein the transmitting of the frame from the device to the host includes transmitting a programmed input/output setup frame information structure (PIO SETUP FIS).

11. The method of claim 1 wherein the updating of the non-status information in the plurality of non-status registers occurs irrespective of whether or not a cyclic redundancy code (CRC) of the frame has been verified.

12. A system comprising:

a host controller;

a device connected to the host controller via a data transmission channel, the data transmission channel configured to transmit a frame having status information and non-status information between the device and the host controller;

a status register in the host controller, the status register being configured to be updated if the frame has no errors;

a buffer for storing the status information of the frame; and a non-status register in the host controller, the non-status register configured to be updated with the non-status information of the frame before the status register is updated with the status information stored in the buffer.

13. The system of claim 12 wherein the frame includes a cyclic redundancy code (CRC) configured to check for errors in the frame.

14. The system of claim 12 further comprising connections configured to transmit a next set of data transfer commands after the status registers have been updated.

15. The system of claim 14 wherein the connection is serial.

16. The system of claim 14 wherein the next set of data transfer commands are selected from a group of interface specifications consisting of Advanced Technology Attachment (ATA) specification, Serial ATA specification, and Advanced Technology Attachment Packet Interface (ATAPI) specification.

17. The system of claim 12 wherein the frame is a register frame information structure (FIS).

18. The system of claim 12 wherein the frame is a programmed input/output setup frame information structure (PIO SETUP FIS).

19. The system of claim 12 wherein the non-status register in the host controller is updated irrespective of whether or not a cyclic redundancy code (CRC) of the frame has been verified.

20. A computer program product residing on a computer readable media comprises instructions for causing a processor to:

transmit a frame having status information and non-status information between the device and the host controller;

store the status information of the frame in a buffer;

update the non-status information in a non-status register;

after the update of the non-status information in the non-status register, determine if the frame has an error; and update a status register of the host controller if the frame includes no error.

21. The computer program product of claim 20 further comprising instructions for causing the processor to transmit a cyclic redundancy code (CRC) applied to the frame being transmitted.

22. The computer program product of claim 20 further comprising instructions for causing the processor to transmit a next set of data transfer commands after the processor has updated the status register of the host controller.

23. The computer program product of claim 20 wherein the instructions causing the processor to transmit the frame and transmit the next set of data transfer commands is performed in a serial fashion.

24. The computer program product of claim 22 wherein the data transfer commands are selected from a group of interface specifications consisting of Advanced Technology Attachment (ATA) specification, Serial ATA specification, and Advanced Technology Attachment Packet Interface (ATAPI) specification.

25. The computer program product of claim 20 further comprising instructions for causing the processor to establish a plurality of shadow task file registers within the host controller, the plurality of shadow task file registers including the status registers and non-status registers.

26. The computer program product of claim 25 wherein the plurality of shadow task file registers emulate legacy parallel task file configurations.

27. The computer program product of claim 20 wherein the frame is a register frame information structure (FIS).

28. The computer program product of claim 20 wherein the frame is a programmed input/output setup frame information structure (PIO SETUP FIS).

29. The computer program product of claim 20 wherein the instructions causing the processor to update the non-status information in the non-status register occurs irrespective of whether or not a cyclic redundancy code (CRC) of the frame has been verified.

* * * * *